United States Patent
Ko et al.

(10) Patent No.: US 9,611,349 B2
(45) Date of Patent: Apr. 4, 2017

(54) METHOD OF PREPARING ELASTIC TERPOLYMER

(71) Applicant: LG CHEM, LTD., Seoul (KR)

(72) Inventors: Jun-Seok Ko, Daejeon (KR); Sung-Cheol Yoon, Daejeon (KR); Sung-Ho Park, Daejeon (KR); Soo-Young Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/888,992

(22) PCT Filed: Oct. 14, 2013

(86) PCT No.: PCT/KR2013/009158
§ 371 (c)(1),
(2) Date: Nov. 4, 2015

(87) PCT Pub. No.: WO2014/200153
PCT Pub. Date: Dec. 18, 2014

(65) Prior Publication Data
US 2016/0145367 A1    May 26, 2016

(30) Foreign Application Priority Data

Jun. 10, 2013   (KR) .................. 10-2013-0066091

(51) Int. Cl.
| *C08F 6/10* | (2006.01) |
| *C08F 6/12* | (2006.01) |
| *C08F 4/6592* | (2006.01) |
| *C08F 210/16* | (2006.01) |
| *C08F 210/18* | (2006.01) |
| *C08F 6/00* | (2006.01) |
| *C08J 11/02* | (2006.01) |

(52) U.S. Cl.
CPC .......... *C08F 210/18* (2013.01); *C08F 4/6592* (2013.01); *C08F 6/003* (2013.01); *C08F 6/10* (2013.01); *C08F 6/12* (2013.01); *C08J 11/02* (2013.01)

(58) Field of Classification Search
CPC .... C08F 4/6592; C08F 210/18; C08F 236/02; C08F 6/10; C08F 6/12
See application file for complete search history.

(56) References Cited

U.S. PATENT DOCUMENTS

| 3,245,967 | A | * | 4/1966 | Moon .................... C08F 6/02 528/483 |
| 3,590,026 | A | | 6/1971 | Carlson et al. |
| 5,191,062 | A | | 3/1993 | Bernier et al. |
| 5,565,533 | A | | 10/1996 | Galimberti et al. |
| 5,639,935 | A | | 6/1997 | Cooper et al. |
| 7,541,427 | B2 | * | 6/2009 | Katayama .......... B01F 7/00466 203/37 |
| 2009/0281360 | A1 | | 11/2009 | Knowles et al. |
| 2011/0092752 | A1 | | 4/2011 | Knowles et al. |
| 2012/0108772 | A1 | * | 5/2012 | Lee ........................ C08F 10/00 526/131 |
| 2014/0024784 | A1 | | 1/2014 | Soddemann et al. |

FOREIGN PATENT DOCUMENTS

| KR | 10-0141681 B1 | 4/1993 |
| KR | 10-0226175 B1 | 7/1999 |
| KR | 10-2000-0023714 A | 4/2000 |
| KR | 10-0280253 B1 | 11/2000 |
| KR | 10-0347975 B1 | 7/2002 |
| KR | 10-2005-0016737 A | 2/2005 |
| KR | 10-0496101 B1 | 6/2005 |
| KR | 10-0533440 B1 | 11/2005 |
| KR | 10-2008-0065868 A | 7/2008 |
| KR | 10-2008-0101542 A | 11/2008 |
| KR | 10-2011-0009122 A | 1/2011 |
| KR | 10-2012-0010030 A | 2/2012 |
| KR | 10-2013-0027487 A | 3/2013 |
| WO | 99/45047 A1 | 9/1999 |

* cited by examiner

*Primary Examiner* — Caixia Lu
(74) *Attorney, Agent, or Firm* — Dentons US LLP (57) ABSTRACT

The present invention relates to a method of preparing an ethylene/alpha-olefin/diene-based elastic copolymer having high viscosity and a high molecular weight, in which energy efficiency of the entire process is optimized. The method of preparing the elastic copolymer includes the steps of: copolymerizing an ethylene/alpha-olefin/diene-based elastic copolymer; and separating and removing the solvent and unreacted monomers from the polymer solution and recovering the elastic copolymer, by sequentially using a gas-liquid separator and a stripper in the purification of the solvent and unreacted monomers.

8 Claims, 2 Drawing Sheets

METHOD OF PREPARING ELASTIC TERPOLYMER

This application is a National Stage Entry of International Application No. PCT/KR2013/009158, filed Oct. 14, 2013, and claims the benefit of and priority to Korean Application No. 10-2013-0066091, filed Jun. 10, 2013, both of which are incorporated by reference in their entirety for all purposes as if fully set forth herein.

TECHNICAL FIELD

The present invention relates to a method of preparing an elastic terpolymer, including the steps of copolymerizing ethylene/α-olefin/diene-based monomers, and then recovering the elastic polymer having high viscosity and high molecular weight by sequentially using a gas-liquid separator and a stripper for optimization of energy efficiency in a process of purifying a solvent and unreacted monomers from a polymer solution.

BACKGROUND ART

In general, when ethylene-propylene-diene-monomers (hereinafter referred to as EPDM) are prepared using a vanadium catalyst, catalyst residues remaining in the polymer are removed using a NaOH aqueous solution and high-pressure steam in order to remove Cl contained in the catalyst from a polymer composition. However, this method is problematic in that a laborious procedure of removing the catalyst in the polymer is required so as to make the process complex.

Further, the process of preparing EPDM using the vanadium catalyst requires much energy, because high-pressure steam is directly fed to the polymer solution in order to recover unreacted monomers, comonomers, and the solvent. The unreacted monomers, comonomers, and solvent removed from the polymer composition are recycled to a reactor after water is removed therefrom by an additional purification process, leading to high purification costs. For example, to prepare 10 tons of EPDM polymers per hour, a total amount of monomers, comonomers, and hexane excluding the EPDM polymer to be fed to the inlet of the reactor is 50 to 100 tons, and to separate them from the polymer and to recycle them to the reactor, catalyst poisons such as water and a catalyst killing agent injected during the process must be eliminated. However, the conventional method has an inefficiency problem of requiring excessive energy during the process.

Further, in the conventional method of preparing EPDM using the vanadium catalytic composition, the solvent and unreacted monomers are steam-stripped in order to recover the polymer. Korean Patent No. 10-0226175 describes a method of removing catalyst residues of the vanadium catalytic composition using water or an aqueous alkaline solution. U.S. Pat. No. 3,590,026 also describes a method of removing the solvent and unreacted monomers in a two-stage steam stripping system. However, removal of the solvent and unreacted monomers from the polymer solution by steam-stripping is also disadvantageous in that it requires energy consumption that is twice or higher than that of the present invention described below, resulting in excessive costs.

To overcome this problem, Korean Patent No. 10-0496101 discloses a method of recovering the polymer by a two-stage anhydrous solvent recovery process upon preparation of EPDM using a metallocene catalytic composition. This method has an advantage of using less energy, but a disadvantage of poor fluidity of the polymer solution when it is used to prepare EPDM polymers having high viscosity and high molecular weight. Further, when a devolatilization extruder is used, a polymer having high density is produced and thus it is necessary to blend with oil, carbon black, or an accelerator for compounding. However, there is a disadvantage of its poor mixing capacity. That is, EPDM having a high molecular weight cannot be prepared by the above method, and after purification, excessively high shear is applied to the extruder, resulting in unfavorable production.

Accordingly, there is a continuous demand for a method of preparing an elastic EPDM copolymer, which is used to prepare EPDM having a high molecular weight and to improve productivity and energy efficiency.

DISCLOSURE

Technical Problem

The present invention provides a method of preparing an elastic terpolymer, which is used to prepare an ethylene-alpha olefin-diene-based elastic copolymer having a high molecular weight with high energy efficiency without excessively high shear of an extruder.

Further, the present invention provides a method of preparing an ethylene-alpha olefin-diene-based elastic copolymer with improved productivity.

Technical Solution

The present invention provides a method of preparing an elastic terpolymer, including the steps of:

copolymerizing a monomer composition including 40 to 70% by weight of ethylene, 15 to 55% by weight of alpha olefin having 3 to 20 carbon atoms, and 0.5 to 20% by weight of diene in the presence of a metallocene catalyst and a solvent in a polymerization reactor so as to prepare a polymer solution including an ethylene-alpha olefin-diene-based copolymer; and separating the solvent and unreacted monomers from the polymer solution by sequentially using a gas-liquid separator and a stripper so as to recover the ethylene-alpha olefin-diene-based copolymer.

The method may include the step of separating and removing 40 to 70% by weight of the total weight of all materials excluding the total polymer included in the polymer solution in the gas-liquid separator, and the step of separating and removing the residual solvent and unreacted monomers excluding the polymer included in the polymer solution in the stripper.

Further, the method may include the step of recovering the solvent and unreacted monomers included in the copolymer so that they are included in an amount of 10% by weight or less, based on the total weight of the copolymer, in the stripper.

According to the present invention, the content of the ethylene-alpha olefin-diene-based copolymer included in the polymer solution before it is passed through the gas-liquid separator may be 10 to 20% by weight, and the content of the ethylene-alpha olefin-diene-based copolymer included in the polymer solution after it is passed through the gas-liquid separator may be 20 to 50% by weight.

Further, a process of removing the solvent and unreacted monomers from the polymer solution under the conditions of a temperature of 150 to 160° C. and a pressure of 5 to 10 bar in the upper portion of the gas-liquid separator may be performed in the gas-liquid separator.

A process of removing the residual solvent and unreacted monomers from the polymer solution passed through the gas-liquid separator may be performed in the stripper by applying steam as a carrier gas under the conditions of a temperature of 140 to 180° C. and a pressure of 4 to 10 bar.

The solvent and unreacted monomers that are separated in the gas-liquid separator and the stripper may be reused in the ethylene-alpha olefin-diene copolymerization.

A step of preparing the copolymer in the form of bales or pellets may be further included, after the step of recovering the copolymer.

As the metallocene catalyst, a catalytic composition including a first transition metal compound represented by the following Chemical Formula 1 and a second transition metal compound represented by the following Chemical Formula 2 is preferably used:

[Chemical Formula 1]

[Chemical Formula 2]

wherein $R_1$ to $R_{13}$ may be the same as or different from each other, and each may independently be hydrogen, an alkyl radical having 1 to 20 carbon atoms, an alkenyl radical having 2 to 20 carbon atoms, an aryl radical having 6 to 20 carbon atoms, a silyl radical, an alkylaryl radical having 7 to 20 carbon atoms, an arylalkyl radical having 7 to 20 carbon atoms, or a hydrocarbyl-substituted metalloid radical of a Group IV metal; of $R_1$ to $R_{13}$, two different neighboring groups are connected to each other by an alkylidine radical including an alkyl having 1 to 20 carbon atoms or an aryl radical having 6 to 20 carbon atoms to form an aliphatic or aromatic ring;

M is a Group IV transition metal; and $Q_1$ and $Q_2$ may be the same as or different from each other, and each may independently be a halogen radical, an alkyl radical having 1 to 20 carbon atoms, an alkenyl radical having 2 to 20 carbon atoms, an aryl radical having 6 to 20 carbon atoms, an alkylaryl radical having 7 to 20 carbon atoms, an arylalkyl radical having 7 to 20 carbon atoms, an alkylamido radical having 1 to 20 carbon atoms, an arylamido radical having 6 to 20 carbon atoms, or an alkylidene radical having 1 to 20 carbon atoms.

The catalytic composition may further include one or more cocatalyst compounds selected from the group consisting of the following Chemical Formula 3, Chemical Formula 4, and Chemical Formula 5:

—[Al(R)—O]$_n$—      [Chemical Formula 3]

wherein Rs may be the same as or different from each other, and each may independently be a halogen, a hydrocarbon having 1 to 20 carbon atoms, or a halogen-substituted hydrocarbon having 1 to 20 carbon atoms; and n is an integer of 2 or more;

D(R)$_3$      [Chemical Formula 4]

wherein R is the same as defined in Chemical Formula 3; and D is aluminum or boron;

[L-H]$^+$[ZA$_4$]$^-$ or [L]$^+$[ZA$_4$]$^-$      [Chemical Formula 5]

wherein L is a neutral or cationic Lewis acid; H is a hydrogen atom; Z is an element of Group 13; and As are the same as or different from each other, and each may independently be an aryl group having 6 to 20 carbon atoms or an alkyl group having 1 to 20 carbon atoms, at which one or more hydrogen atoms are substituted or unsubstituted with a halogen, a hydrocarbon having 1 to 20 carbon atoms, an alkoxy, or a phenoxy.

The alpha olefin may be one or more selected from the group consisting of propylene, 1-butene, 1-hexene, and 1-octene, and the diene may be one or more selected from the group consisting of 5-ethylidene-2-norbornene, 5-methylene-2-norbornene, 5-vinyl-2-norbornene, 1,4-hexadiene, and dicyclopentadiene.

Effect of the Invention

As described above, in the process of preparing an ethylene-alpha olefin-diene-based elastic copolymer according to the present invention, a solvent and unreacted monomers may be removed from a polymer solution by sequentially using a gas-liquid separator (flashing process) and a stripper, so as to prepare an elastic copolymer with high viscosity and high molecular weight. In the present invention, the solvent and unreacted monomers removed from the polymer solution may be recovered and reused in copolymerization for the preparation of the elastic polymer, thereby properly preparing EPDM having a high molecular weight with high energy efficiency without excessively high shear of an extruder.

DETAILED DESCRIPTION OF THE EMBODIMENTS

Hereinafter, a preparation method of an elastic terpolymer according to specific embodiments of the present invention will be described in detail.

First, as used herein, the term "elastic terpolymer" refers to any elastic copolymer (e.g., a crosslinkable random copolymer) obtained by copolymerization of three kinds of monomers of ethylene, an alpha-olefin having 3 to 20 carbon atoms, and diene. A representative example of the "elastic terpolymer" is EPDM rubber which is a copolymer of ethylene, propylene, and diene. However, it is apparent that this "elastic terpolymer" refers not only to the copolymer of the three monomers, but also any elastic copolymer obtained by copolymerization of one or more monomers belonging to alpha-olefin and one or more monomers belonging to diene, together with ethylene. For example, an elastic copolymer obtained by copolymerization of ethylene, two kinds of alpha-olefins of propylene and 1-butene, and two kinds of dienes of ethylidene norbornene and 1,4-hexadiene may also be included in the scope of the "elastic terpolymer", because it is also obtained by copolymerization of three kinds of monomers belonging to ethylene, alpha-olefin, and diene, respectively.

Meanwhile, according to an embodiment of the present invention, a method of preparing an elastic terpolymer is provided, including the steps of: copolymerizing a monomer composition including 40 to 70% by weight of ethylene, 20 to 50% by weight of alpha olefin having 3 to 20 carbon atoms, and 0 to 20% by weight of diene in the presence of a metallocene catalyst and a solvent in a polymerization reactor so as to prepare a polymer solution including an ethylene-alpha olefin-diene-based copolymer; and separating the solvent and unreacted monomers from the polymer solution by sequentially using a gas-liquid separator and a stripper so as to recover the ethylene-alpha olefin-diene-based copolymer.

The present invention is characterized in that the gas-liquid separator and the stripper are sequentially used in order to recover the solvent and unreacted monomers from the resulting polymer solution after reaction in the preparation process of the ethylene-alpha olefin-diene-based elastic polymer such as EPDM.

More specifically, the present invention is characterized in that the solvent and unreacted monomers are primarily recovered from the polymer solution through the gas-liquid separator so as to reduce energy costs. Further, the residual solvent and unreacted monomers are secondarily recovered from the polymer solution by steam stripping through the stripper after the gas-liquid separator, so as to prepare a copolymer with high viscosity and high molecular weight. Therefore, the polymer prepared according to the present invention shows excellent compounding with additives, thereby being easily commercialized.

Further, the present invention may provide a process of effectively separating and recovering the solvent, unreacted monomers, and comonomers from the elastic-based polymer including EPDM in the polymer solution prepared in a single polymerization reactor, removing catalyst poisons therefrom, and then recycling them to the reactor for commercialization of the polymer. According to this process of the present invention, the solvent and unreacted monomers separated in the gas-liquid separator and the stripper may be reused in copolymerization for preparation of the ethylene-alpha olefin-diene-based elastic copolymer.

A step of separating and removing 40 to 70% by weight of the total weight of all materials excluding the total polymer included in the polymer solution may be performed in the gas-liquid separator, and a step of separating and removing the residual solvent and unreacted monomers excluding the polymer included in the polymer solution may be performed in the stripper.

Further, a step of recovering the solvent and unreacted monomers included in the copolymer so that they are included in an amount of 10% by weight or less based on the total weight of the copolymer may be performed in the stripper.

According to the present invention, the content of the ethylene-alpha olefin-diene-based copolymer included in the polymer solution before it is passed through the gas-liquid separator may be 10 to 20% by weight, and the content of the ethylene-alpha olefin-diene-based copolymer included in the polymer solution after it is passed through the gas-liquid separator may be 20 to 50% by weight. That is, the content of the elastic copolymer before purification is 10 to 20% by weight and the content of the elastic copolymer after it is primarily passed through the gas-liquid separator is allowed to be about 20 to 50% by weight, thereby further increasing the polymer content, compared to the conventional method. In the present invention, comonomers together with the solvent and unreacted monomers are also secondarily eliminated through the stripper, thereby improving viscosity and molecular weight of the final polymer.

In the present invention, particularly, conditions of the gas-liquid separator and the stripper are specified while they are used, thereby effectively removing the solvent, unreacted monomers, and comonomers from the polymer solution.

Preferably, a process of removing the solvent and unreacted monomers from the polymer solution under the conditions of a temperature of 150 to 160° C. and a pressure of 5 to 10 bar in the upper portion of the gas-liquid separator may be performed in the gas-liquid separator. In this regard, if the temperature is lower than 150° C., or the pressure is higher than 10 bar in the upper portion of the gas-liquid separator, there is a problem that the amount of the solvent and the unreacted monomers removed from the polymer solution is less than the desired amount. If the temperature is higher than 160° C. or the pressure is lower than 5 bar, there is a problem that the amount of the solvent and the unreacted monomers removed from the polymer solution is larger than the desired amount. Further, the gas-liquid separator means an anhydrous gas-liquid separator.

Further, a process of removing the residual solvent and unreacted monomers from the polymer solution passed through the gas-liquid separator may be performed in the stripper by applying steam as a carrier gas under the conditions of a temperature of 140 to 180° C. and a pressure of 4 to 10 bar. In this regard, if the temperature is lower than 90° C. or the pressure is higher than 0.3 bar in the stripper, there is a problem that the amount of the solvent and the unreacted monomers removed from the polymer solution is less than the desired amount. If the temperature is higher than 180° C. or the pressure is lower than 3 bar, there is a problem that an excessively large amount of steam is needed for removal of the solvent and the unreacted monomers from the polymer solution.

Additionally, in the preparation method of the elastic copolymer according to an embodiment of the present invention, a monomer composition having predetermined contents of monomers, that is, about 40 to 70% by weight or about 50 to 70% by weight of ethylene, about 15 to 55% by weight or about 25 to 45% by weight of alpha olefin having 3 to 20 carbon atoms, and about 0.5 to 20% by weight or about 2 to 10% by weight of diene may be used.

Further, according to the present invention, the ethylene-alpha olefin-diene-based elastic copolymer may be prepared by copolymerizing the respective monomers in the presence of a catalytic composition including a Group IV transition metal. Further, the copolymerization may be performed by solution polymerization, in particular, continuous solution polymerization. In this regard, the above-described catalytic composition may be dissolved in the solution, and thus used in the form of a homogeneous catalyst.

After copolymerization, as the above-described gas-liquid separator and stripper are sequentially used, the elastic terpolymer of an embodiment which satisfies a high molecular weight range and an ethylene content may be produced with high yield and productivity through a purification process of the polymer solution.

Further, the preparation method of the elastic copolymer includes the step of performing the polymerization reaction by solution polymerization at a reaction temperature of 80 to 150° C. and a reaction pressure of 75 to 120 bar for a retention time of 0.05 to 0.5 h to prepare an ethylene-alpha olefin-diene-based elastic copolymer having a polymer concentration of 5 to 20% by weight. According to the present invention, as the contents of the respective monomers are controlled within the above-described optimized range, the respective monomers may be alternately distributed more uniformly in the polymer chains, which allows effective preparation of the elastic terpolymer satisfying the properties of an embodiment.

Further, the method of the present invention may further include the step of preparing the copolymer in the form of bales or pellets, after the step of recovering the copolymer. The method of preparing the product in the form of bales or pellets may be performed by a method that is well known in the art.

With respect to the preparation method of the ethylene-alpha olefin-diene-based elastic copolymer according to an embodiment of the present invention, a preparation method of an EPDM elastic copolymer will be described with reference to drawings.

Figure 1:
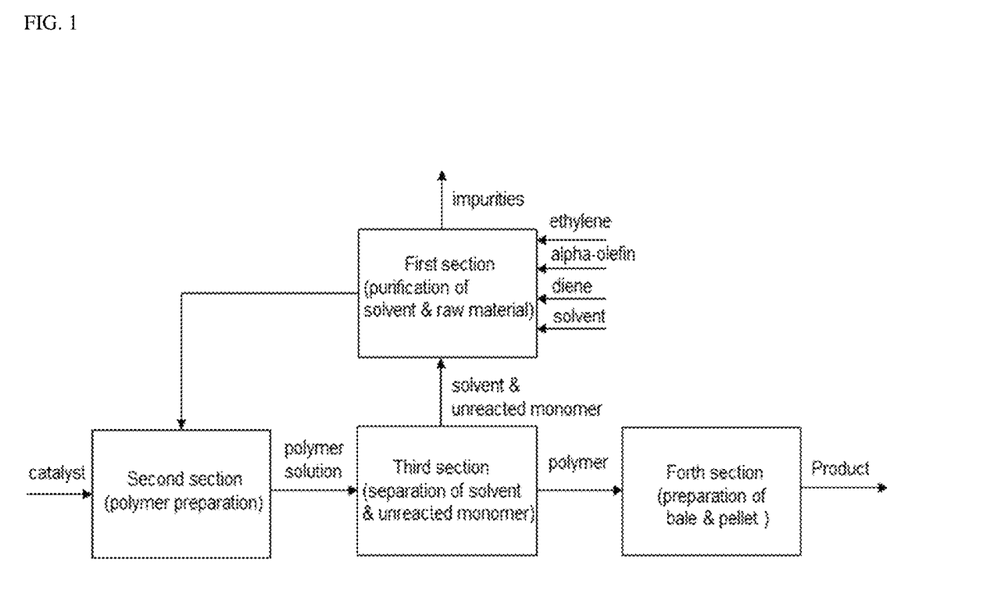
FIG. 1 is a schematic illustration showing a general solution polymerization process of preparing an EPDM elastic copolymer.

FIG. 1 is a schematic illustration showing a flowchart of a general solution polymerization process of preparing the EPDM elastic copolymer. As illustrated in FIG. 1, the EPDM preparation process may be largely divided into a first section for purification of solvent/raw materials, a second section for polymer preparation, a third section for separation of solvent/unreacted monomers, and a fourth section for preparation of bales/pellets.

The first section may be a section for purifying raw materials, and the solvent and unreacted monomers that are separated from the polymer after they are used in the polymer preparation. The first section may include a section to which the raw materials and the solvent for preparation of the elastic polymer are fed, and in the section, a purification process is carried out to remove impurities.

The second section is a section for preparing the polymer in the presence of the metallocene catalytic composition using the raw materials and solvent which are purified in the first section. Therefore, the metallocene catalyst may be fed to the second section.

The third section is a section for separating the solvent and the unreacted monomers from the polymer solution prepared in the second section, and then transferring the polymer to the fourth section.

In the fourth section, the residual solvent and unreacted monomers that are not separated in the third section are further separated from the polymer that is separated in the third section, and then water is removed therefrom for commercialization. Further, the fourth section is a section for preparing the product in the form of pellets or bales.

However, the conventional method has a limitation in the preparation of the elastic polymer having high viscosity and high molecular weight because residual solvent and unreacted monomers are separated during commercialization of the polymer, thereby reducing energy efficiency.

Figure 2:
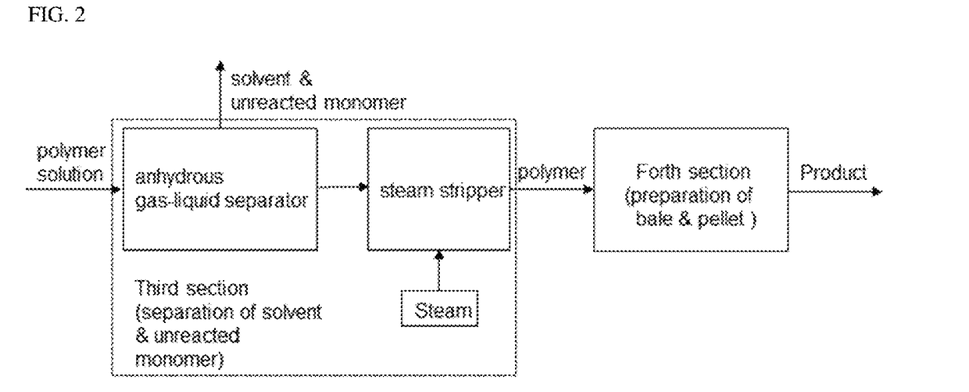
FIG. 2 is a schematic illustration showing a process of recovering a solvent and unreacted monomers by sequentially using a gas-liquid separator and a stripper in a preparation process of the EPDM elastic copolymer according to the present invention.

In contrast, in the present invention, as shown in FIG. 2, the step of completely separating and recovering the solvent and unreacted monomers from the polymer solution by sequentially using the gas-liquid separator and stripper is performed in the third section. That is, FIG. 2 is a schematic illustration showing a process of recovering the solvent and unreacted monomers by sequentially using a gas-liquid separator and a stripper in the preparation process of EPDM elastic copolymer according to the present invention.

In this regard, the gas-liquid separator represents an anhydrous gas-liquid separator illustrated in FIG. 2, and the stripper represents a steam stripper to which steam is supplied as a carrier gas.

According to an embodiment, when the polymer solution is sequentially passed through the anhydrous gas-liquid separator and the steam stripper during the purification process, the solvent and unreacted monomers used in the reaction and comonomers are separated, and the separated solvent and unreacted monomers are recovered and recycled to the first section, and then they are reused in the polymer preparation of the second section through the solvent/raw material purification process.

In the present invention, the first, second, and fourth sections may be constituted according to a method that is well known in the art, except that the gas-liquid separator and the stripper are sequentially used in the third section.

For example, the solvent/raw material purification process of the first section is not particularly limited, and it is possible to use any method of removing impurities which is well known in the art.

In the preparation process of EPDM according to the present invention, solution polymerization may be performed using the above-described metallocene catalyst in the second section.

In the fourth section, commercialization of the polymer may be performed by a general process of preparing bales/pellets.

The elastic copolymer of an embodiment of the present invention may be prepared by using a device including: a polymerization reactor for preparing the polymer solution including the ethylene-alpha olefin-diene copolymer by polymerization of ethylene, alpha olefin having 3 to 20 carbon atoms, and diene which are fed from a raw material supplying device in the presence of the metallocene catalyst and the solvent; a gas-liquid separator which is connected to the polymerization reactor to primarily separate the solvent and unreacted monomers from the polymer solution; a stripper which is sequentially connected to the gas-liquid separator to secondarily separate the residual solvent and unreacted monomers from the polymer solution, from which the solvent and unreacted monomers are primarily removed in the gas-liquid separator, and to recover the copolymer; and a dryer for drying the copolymer recovered from the stripper. Further, the preparation method of the elastic copolymer of the present invention is advantageous in that removal of the catalyst in the polymer is not needed because the metallocene catalyst is used.

The polymerization reactor may be equipped with a continuous agitator and an outlet for transferring the polymer solution including the ethylene-propylene-diene copolymer to the next stage after completion of the solution polymerization. The outlet may be installed at the upper side of the polymerization reactor to continuously discharge the polymer solution during the polymerization process and to transfer the polymer solution to the gas-liquid separator through a pump. Therefore, between the polymerization reactor and the gas-liquid separator, the pump may be equipped as a means for transferring the polymer solution from the polymerization reactor to the gas-liquid separator.

Further, the gas-liquid separator may be equipped with the outlet at its upper portion in order to discharge and recover a part of the solvent and unreacted monomers, which are separated from the polymer solution supplied by the polymerization reactor. That is, the solvent and unreacted monomers which are primarily separated and purified in the gas-liquid separator are recycled to the raw material supplying device via a transfer line that is connected to the upper portion of the gas-liquid separator.

In addition, the residual polymer solution in the gas-liquid separator is discharged through the transfer line that is connected to the lower portion of the gas-liquid separator, and then transferred to the stripper. In the stripper, a process of purifying the residual solvent and unreacted monomers from the polymer solution that is primarily purified in the gas-liquid separator is performed. A means for supplying steam as a carrier gas and a means for controlling the supply of steam may be connected to the stripper. Further, the solvent and unreacted monomers that are secondarily separated and purified in the stripper may be recycled to the raw material supplying device via the transfer line connected to the upper portion of the stripper.

The polymer, from which the residual solvent and unreacted monomers are removed by the secondary purification process in the stripper, may be transferred to the dryer via a transfer line that is connected to the lower side of the stripper. Drying conditions for the polymer in the dryer are not particularly limited, and drying may be performed under the conditions that are well known in the art.

Meanwhile, in the preparation method of the elastic terpolymer of an embodiment, the alpha-olefin may be one or more alpha-olefins having 3 to 20 carbon atoms such as propylene, 1-butene, 1-hexene, 1-octene, 1-pentene, 4-methyl-1-pentene, 1-hexene, 1-heptene, 1-decene, 1-undecene, 1-dodecene, 1-tridecene, 1-tetradecene, 1-pentadecene, 1-hexadecene, 1-heptadecene, 1-nonadecene, 9-methyl-1-decene, 11-methyl-1dodecene, 12-ethyl-1-tetradecene, etc. Of them, alpha-olefins having 3 to 10 carbon atoms, as for representative examples, propylene, 1-butene, 1-hexene, or 1-octene may be properly used. Further, a non-conjugated diene-based monomer may be used as the diene. Specific examples thereof may include 5-ethylidene-2-norbornene, 5-methylene-2-norbornene, 5-vinyl-2-norbornene, 5-(2-propenyl)-2-norbornene, 5-(3-butenyl)-2-norbornene, 5-(1-methyl-2-propenyl)-2-norbornene, 5-(4-pentenyl)-2-norbornene, 5-(1-methyl-3-butenyl)-2-norbornene, 5-(5-hexenyl)-2-norbornene, 5-(1-methyl-4-pentenyl)-2-norbornene, 5-(2,3-dimethyl-3-butenyl)-2-norbornene, 5-(2-ethyl-3-butenyl)-2-norbornene, 5-(6-heptenyl)-2-norbornene, 5-(3-methyl-hexenyl)-2-norbornene, 5-(3,4-dimethyl-4-pentenyl)-2-norbornene, 5-(3-ethyl-4-pentenyl)-2-norbornene, 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene, 5-(1,2,3-trimethyl-4-pentenyl)-2-norbornene, 5-propylidene-2-norbornene, 5-isopropylidene-2-norbornene, 5-butylidene-2-norbornene, 5-isobutylidene-2-norbornene, 2,3-diisopropylidene-5-norbornene, 2-ethylidene-3-isopropylidene-5-norbornene, 2-propenyl-2,2-norbornadiene, 1,4-hexadiene, or dicyclopentadiene, and one or more dienes selected therefrom may be used. Of them, 5-ethylidene-2-norbornene, 5-methylene-2-norbornene, 5-vinyl-2-norbornene, 1,4-hexadiene, or dicyclopentadiene may be properly used.

Further, the metallocene catalyst used for preparation of the elastic copolymer in the present invention may preferably be a catalytic composition including a first transition metal compound represented by the following Chemical Formula 1 and a second transition metal compound represented by the following Chemical Formula 2:

[Chemical Formula 1]

[Chemical Formula 2]

wherein $R_1$ to $R_{13}$ may be the same as or different from each other, and each may independently be hydrogen, an alkyl radical having 1 to 20 carbon atoms, an alkenyl radical having 2 to 20 carbon atoms, an aryl radical having 6 to 20 carbon atoms, a silyl radical, an alkylaryl radical having 7 to 20 carbon atoms, an arylalkyl radical having 7 to 20 carbon atoms, or a hydrocarbyl-substituted metalloid radical of a Group IV metal; of $R_1$ to $R_{13}$, two different neighboring groups are connected to each other by an alkylidine radical including an alkyl having 1 to 20 carbon atoms or aryl radical having 6 to 20 carbon atoms to form an aliphatic or aromatic ring;

M is a Group IV transition metal; and

$Q_1$ and $Q_2$ may be the same as or different from each other, and each may independently be a halogen radical, an alkyl radical having 1 to 20 carbon atoms, an alkenyl radical having 2 to 20 carbon atoms, an aryl radical having 6 to 20 carbon atoms, an alkylaryl radical having 7 to 20 carbon atoms, an arylalkyl radical having 7 to 20 carbon atoms, an alkylamido radical having 1 to 20 carbon atoms, an arylamido radical having 6 to 20 carbon atoms, or an alkylidene radical having 1 to 20 carbon atoms.

In Chemical Formulae 1 and 2, the hydrocarbyl refers to a monovalent moiety obtained upon removal of a hydrogen atom from a hydrocarbon, and for example, it encompasses an alkyl group such as ethyl, etc., or an aryl group such as phenyl, etc.

Further, in Chemical Formulae 1 and 2, metalloid means a semi-metal having properties of both a metal and a non-metal, and refers to arsenic, boron, silicon, tellurium, or the like. M refers to, for example, a Group IV transition metal element such as titanium, zirconium, hafnium, or the like.

Of these first and second transition metal compounds, the first transition metal compound of Chemical Formula 1 may be properly one or more selected from the group consisting of the following compounds:

wherein $R_2$ and $R_3$ are the same as or different from each other and each is independently hydrogen or a methyl radical, M is a Group IV transition metal, and $Q_1$ and $Q_2$ are the same as or different from each other and each is independently a methyl radical, a dimethylimido radical, or a chlorine radical.

Further, the second transition metal compound of Chemical Formula 2 may be properly one or more selected from the group consisting of the following compounds:

wherein $R_2$ and $R_3$ are the same as or different from each other and each is independently hydrogen or a methyl radical, M is a Group IV transition metal, $Q_1$ and $Q_2$ are the same as or different from each other and each is independently a methyl radical, a dimethylimido radical, or a chlorine radical.

Additionally, the catalytic composition may further include one or more cocatalytic compounds selected from the group consisting of the following Chemical Formula 3, Chemical Formula 4, and Chemical Formula 5:

—[Al(R)—O]$_n$—      [Chemical Formula 3]

wherein R is the same as or different from each other and each is independently halogen, a hydrocarbon having 1 to 20 carbon atoms, or a halogen-substituted hydrocarbon having 1 to 20 carbon atoms; and n is an integer of 2 or more;

D(R)$_3$      [Chemical Formula 4]

wherein R is the same as defined in Chemical Formula 3; and D is aluminum or boron;

[L-H]$^+$[ZA$_4$]$^-$ or [L]$^+$[ZA$_4$]$^-$      [Chemical Formula 5]

wherein L is a neutral or cationic Lewis acid; H is a hydrogen atom; Z is an element of Group 13; and As are the same as or different from each other and each is independently an aryl group having 6 to 20 carbon atoms or an alkyl group having 1 to 20 carbon atoms, in which one or more hydrogen atoms are unsubstituted or substituted with a halogen, a hydrocarbon having 1 to 20 carbon atoms, an alkoxy, or a phenoxy.

In the cocatalytic compound, examples of the compound represented by Chemical Formula 3 may include methylaluminoxane, ethylaluminoxane, isobutylaluminoxane, butylaluminoxane, or the like.

Further, examples of the compound represented by Chemical Formula 4 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide, dimethylaluminum ethoxide, trimethylboron, triethylboron, triisobutylboron, tripropylboron, tributylboron, or the like, and of them, trimethylaluminum, triethylaluminum, or triisobutylaluminum may be properly used.

The compound represented by Chemical Formula 5 may include a non-coordinating anion compatible with a cation as the Bronsted acid. Preferred anions are those including a single coordination complex having a large size and a semi-metal. In particular, compounds including a single boron atom in the anion portion are widely used. In this regard, salts having anions including a coordination complex including a single boron atom are preferably used as the compound represented by Chemical Formula 5.

As specific examples thereof, examples of trialkylammonium salts may include trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(2-butyl)ammonium tetrakis(pentafluorophenyl)borate, N,N-dimethylanilinium (pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-triisopropylsilyl)-2,3,5,6-tetrafluorophenyl)borate, N,N-dimethylanilinium pentafluorophenoxytris(pentafluorophenyl)borate, N,N-diethylanilinium tetrakis(pentafluorophenyl)borate, N,N-dimethyl-2,4,6-trimethylanilinium tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate, N,N-dimethyl-2,4,6-trimethylanilinium tetrakis(2,3,4,6-tetrafluorophenyl)borate, decyldimethylammonium tetrakis(pentafluorophenyl)borate, dodecyldimethylammonium tetrakis(pentafluorophenyl)borate, tetradecyldimethylammonium tetrakis(pentafluorophenyl)borate, hexadecyldimethylammonium tetrakis(pentafluorophenyl)borate, octadecyldimethylammonium tetrakis(pentafluorophenyl)borate, eicosyldimethylammonium tetrakis(pentafluorophenyl)borate, methyldidecylammonium tetrakis(pentafluorophenyl)borate, methyldidodecylammonium tetrakis(pentafluorophenyl)borate, methylditetradecylammonium tetrakis(pentafluorophenyl)borate, methyldihexadecylammonium tetrakis(pentafluorophenyl)borate, methyldioctadecylammonium tetrakis(pentafluorophenyl)borate, methyldieicosylammonium tetrakis(pentafluorophenyl)borate, tridecylammonium tetrakis(pentafluorophenyl)borate, tridodecylammonium tetrakis(pentafluorophenyl)borate, tritetradecylammonium tetrakis(pentafluorophenyl)borate, trihexadecylammonium tetrakis(pentafluorophenyl)borate, trioctadecylammonium tetrakis(pentafluorophenyl)borate, trieicosylammonium tetrakis(pentafluorophenyl)borate, decyldi(n-butyl)ammonium tetrakis(pentafluorophenyl)borate, dodecyldi(n-butyl)ammonium tetrakis(pentafluorophenyl)borate, octadecyldi(n-butyl)ammonium tetrakis(pentafluorophenyl)borate, N,N-didodecylanilinium tetrakis(pentafluorophenyl)borate, N-methyl-N-dodecylanilinium tetrakis(pentafluorophenyl)borate, methyldi(dodecyl)ammonium tetrakis(pentafluorophenyl)borate, or the like.

Further, examples of dialkylammonium salts may include di-(i-propyl)ammonium tetrakis(pentafluorophenyl)borate, dicyclohexylammonium tetrakis(pentafluorophenyl)borate, or the like.

Further, examples of carbonium salts may include tropylium tetrakis(pentafluorophenyl)borate, triphenylmethylium tetrakis(pentafluorophenyl)borate, benzene(diazonium) tetrakis(pentafluorophenyl)borate, or the like.

Meanwhile, the catalytic composition including the above-described first and second transition metal compounds, and optionally the cocatalytic compound, may be prepared by, for example, a method including the steps of contacting the first and second transition metal compounds with the cocatalytic compound of Chemical Formula 3 or Chemical Formula 4 to prepare a mixture, and adding the cocatalytic compound of Chemical Formula 5 to the mixture.

Further, in the catalytic composition, a molar ratio of the first transition metal compound to the second transition metal compound may be about 10:1 to 1:10, a molar ratio of the total transition metal compound of the first and second transition metal compounds to the cocatalytic compound of Chemical Formula 3 or Chemical Formula 4 may be about 1:5 to 1:500, and a molar ratio of the total transition metal compound to the cocatalytic compound of Chemical Formula 5 may be about 1:1 to 1:10.

Further, the catalytic composition may additionally include a reaction solvent, and examples of the reaction solvent may include hydrocarbon-based solvents such as pentane, hexane, or heptane, etc., or aromatic solvents such as benzene, toluene, etc., but are not limited thereto.

As described above, the alpha-olefin included in the monomer composition may include propylene, 1-butene, 1-hexene, 1-octene, 1-pentene, 4-methyl-1-pentene, 1-hexene, 1-heptene, 1-decene, 1-undecene, 1-dodecene, or the like, and as the diene, a non-conjugated diene-based monomer may be used. Of them, as the monomers typically used in the preparation of EPDM rubber, for example, propylene as the alpha-olefin and a non-conjugated diene-based monomer such as 5-ethylidene-2-norbornene, 1,4-hexadiene, or dicyclopentadiene as the diene may be properly used.

The elastic copolymer prepared by the method of an embodiment of the present invention, resulting from copolymerization of three kinds of monomers of ethylene, alpha-olefin, and diene within a predetermined content range, has a relatively high weight average molecular weight of about 100,000 to 500,000, or about 1500,000 to 400,000, or 200,000 to 300,000, as measured by GPC. Such high weight average molecular weight is achieved due to excellent activity of a Group IV transition metal catalyst, for example, metallocene-based first and second transition metal compounds of Chemical Formulae 1 and 2. As the elastic terpolymer of an embodiment has such a high molecular weight, the elastic terpolymer, for example, EPDM rubber, exhibits excellent mechanical properties.

Further, the elastic terpolymer of an embodiment of the present invention satisfies more improved elasticity and flexibility at the same time, together with excellent mechanical properties. Therefore, the elastic terpolymer of an embodiment may be prepared with, for example, the characteristic high productivity and yield of a Group IV metallocene-based transition metal catalyst, and it has a high molecular weight, thereby satisfying excellent mechanical properties, while satisfying excellent processability, elasticity, and flexibility at the same time by solving the problems of the conventional EPDM rubber prepared by the Group IV metallocene-based transition metal catalyst.

Further, the elastic copolymer of an embodiment of the present invention prepared by the above method may have a Mooney viscosity (1+4@125° C.) range capable of satisfying physical properties suitable for EPDM rubber, for example, a Mooney viscosity of about 5 to 150, or about 10 to 130, or about 10 to 120.

Hereinafter, the present invention will be described in more detail in the following examples. However, these examples are for illustrative purposes only and are not intended to limit the scope of the present invention.

Examples 1 to 10

Figure 3:
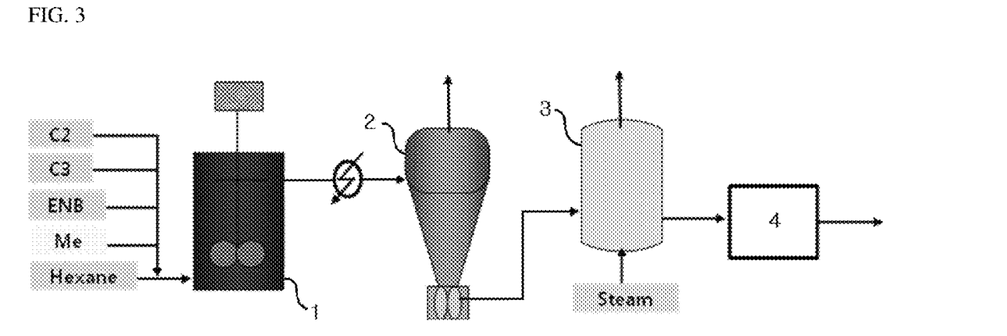
FIG. 3 is a schematic illustration showing a device for EPDM elastic copolymer preparation, which is equipped with the gas-liquid separator and the stripper according to the present invention.

As shown in FIG. 3, an EPDM elastic polymer was prepared using a device that is sequentially installed with a polymerization reactor 1 connected with a device feeding raw materials, a solvent, and a catalyst and equipped with a continuous agitator, a gas-liquid separator 2, a stripper 3 installed with a steam feeding device, and a dryer 4. FIG. 3 is a schematic illustration showing a device for EPDM elastic copolymer preparation, which is equipped with the gas-liquid separator and the stripper according to the present invention.

In detail, a composition including raw materials (ethylene ($C_2H_4$), propylene ($C_3H_6$), and 5-ethylidene-2-norbornene (ENB)), a solvent (hexane), and a catalytic composition (metallocene catalyst) as in Table 1 were continuously fed to the lower side of the polymerization reactor.

That is, as first and second transition metal compounds, the above-described [(1,2,3,4-tetrahydroquinolin-8-yl)tetramethylcyclopentadienyl-eta5,kapa-N]titanium dimethyl and [(2-methylindolin-7-yl)tetramethylcyclopentadienyl-eta5,kapa-N]titanium dimethyl dissolved in hexane were fed to the reactor. Further, as the cocatalytic compound, N,N-dimethylanilinium tetrakis(pentafluorophenyl)borate dissolved in toluene was fed to the reactor. In addition, as the additional cocatalytic compound, triisobutylaluminum dissolved in hexane was fed to the reactor.

Further, solution polymerization was allowed to occur while continuously feeding the respective monomers and the catalytic compositions and continuously agitating the polymerization reactor. After completion of the solution polymerization, a polymer solution including ethylene-propylene-diene copolymers was continuously discharged from the upper side of the polymerization reactor 1, and transferred to the gas-liquid separator 2 via a pump. In the gas-liquid separator, a part of the solvent and unreacted monomers was removed from the polymer solution, and then discharged from the upper portion of the gas-liquid separator, and recovered. The residual polymer solution in the gas-liquid separator was discharged from the lower portion of the gas-liquid separator, and transferred to the stripper 3. Steam as a carrier gas was continuously fed to the stripper 3 to separate the residual solvent and unreacted monomers from the polymer solution which was passed through the gas-liquid separator. The residual solvent and unreacted monomers separated from the polymer solution were discharged from the upper portion of the stripper, and recovered. The copolymer (EPDM elastic copolymer), from which the residual solvent and unreacted monomers were removed, was discharged from the lower portion of the stripper and transferred to the dryer 4. In the dryer 4, the copolymer was dried at a temperature of 100° C. for 4 hours, and then recovered. The copolymer thus recovered was prepared in the form of pellets by a general method, and used for commercialization. Further, the solvent and unreacted monomers that were discharged and recovered from the gas-liquid separator and the stripper were transferred to the raw material supplying device and reused in the preparation of the ethylene-propylene-diene copolymer.

Table 2 shows conversion ratio and catalytic activity under feeding conditions of raw materials and internal conditions of the reactor. Composition and Mooney viscosity (MV) of the EPDM elastic copolymer were measured, and the results are shown in Table 3. Further, removal rates of the solvent and unreacted monomers in the entire process are as shown in Table 4.

TABLE 1

| | $C_2H_4$ kg/h | $C_3H_6$ kg/h | ENB ml/min | $C_6H_{12}$ kg/hr | Catalyst[a] ml/min | Cocatalyst[b] ml/min | TiBal[c] ml/min |
|---|---|---|---|---|---|---|---|
| Example 1 | 0.95 | 0.83 | 2.47 | 7.47 | 4.53 | 8.00 | 6.53 |
| Example 2 | 0.90 | 0.82 | 3.50 | 7.00 | 5.00 | 8.00 | 7.00 |
| Example 3 | 0.90 | 0.82 | 3.50 | 7.00 | 5.00 | 8.00 | 7.00 |
| Example 4 | 0.89 | 0.55 | 5.13 | 6.68 | 5.00 | 5.00 | 5.00 |
| Example 5 | 0.89 | 0.55 | 5.13 | 6.68 | 5.00 | 5.00 | 5.00 |
| Example 6 | 0.90 | 0.45 | 3.40 | 6.81 | 5.00 | 5.00 | 3.00 |
| Example 7 | 0.90 | 0.45 | 3.40 | 6.81 | 5.00 | 5.00 | 3.00 |
| Example 8 | 0.89 | 0.55 | 5.13 | 6.68 | 4.00 | 5.00 | 5.00 |
| Example 9 | 0.89 | 0.55 | 5.13 | 6.68 | 2.50 | 5.00 | 5.00 |
| Example 10 | 0.89 | 0.55 | 1.51 | 7.68 | 3.50 | 3.50 | 3.00 | note)
[a] catalyst: first and second transition metal compounds (molar ratio of 1:1), 0.1 mmol/l
[b] co-catalyst: N,N-dimethylanilinium tetrakis(pentafluorophenyl)borate, 0.5 mmol/l
[c] Triisobutylaluminium (TiBal): 10 mmol/l

TABLE 2

| | Feed ° C. | R. TOP ° C. | Press. kg/cm² | Conversion ratio (%) $C_2H_4$ | $C_3H_6$ | $C_6H_{12}$ | Activity Ton/ mol · h |
|---|---|---|---|---|---|---|---|
| Example 1 | −6.5 | 121.7 | 89 | 60.7 | 35.8 | 36.8 | 33.8 |
| Example 2 | 15.8 | 120 | 89 | 63.4 | 42.8 | 41.5 | 33.3 |
| Example 3 | 27.0 | 130 | 89 | 69.5 | 47.0 | 47.4 | 36.7 |
| Example 4 | 10.2 | 152.4 | 89 | 91.0 | 60.0 | 58.0 | 43.3 |
| Example 5 | 34.0 | 158.9 | 89 | 86.3 | 51.7 | 53.5 | 40.0 |
| Example 6 | 20.3 | 159.6 | 89 | 99.0 | 61.4 | 61.7 | 42.7 |
| Example 7 | −3.8 | 148.1 | 89 | 92.3 | 62.9 | 64.0 | 41.0 |
| Example 8 | 50.3 | 159 | 89 | 66.2 | 39.6 | 41.0 | 38.3 |
| Example 9 | 50.8 | 158.1 | 89 | 63.9 | 38.3 | 39.6 | 59.2 |
| Example 10 | 59.0 | 158.9 | 89 | 94.4 | 66.3 | 65.2 | 59.9 |

TABLE 3

| | Composition $C_2H_4$ | $C_3H_6$ | $C_6H_{12}$ | MV 1 + 4, 125 ° C. | Weight average molecular weight (Mw) |
|---|---|---|---|---|---|
| Example 1 | 62.5 | 32.2 | 5.3 | 110.0 | 254,000 |
| Example 2 | 57.1 | 35.1 | 7.8 | 132.5 | 369,000 |
| Example 3 | 56.9 | 35.0 | 8.1 | 75.7 | 247,000 |
| Example 4 | 62.3 | 25.4 | 12.3 | 72.9 | 288,000 |
| Example 5 | 64.0 | 23.7 | 12.3 | 59.3 | 232,000 |
| Example 6 | 69.6 | 21.6 | 8.8 | 65.3 | 240,000 |
| Example 7 | 67.5 | 23.0 | 9.5 | 87.0 | 296,000 |
| Example 8 | 64.0 | 23.7 | 12.3 | 55.2 | 224,000 |
| Example 9 | 64.0 | 23.7 | 12.3 | 81.4 | 267,000 |
| Example 10 | 66.8 | 29.0 | 4.2 | 33.4 | 154,000 |

As shown in the results of Table 3, Mooney viscosity of EPDM was 30 or higher (1+4@125° C.), suggesting that an elastic terpolymer having high viscosity can be obtained according to the present invention.

TABLE 4

| | Reactor outlet | | | Gas-liquid separator | | | Stripper | | Removal rate of solvent and unreacted monomer | |
|---|---|---|---|---|---|---|---|---|---|---|
| Example | Total flow rate kg/h | Content of copolymer % wt | Amount of monomer and solvent kg/h | Amount of unreacted monomer and solvent removed kg/h | Total flow rate after Flashing kg/h | Content of copolymer % wt | Amount of unreacted monomer and solvent removed kg/h | Amount of copolymer produced kg/h | Gas-liquid separator % wt | Stripper % wt |
| 1 | 10.13 | 9.1 | 9.21 | 4.80 | 5.33 | 17.3 | 4.41 | 0.92 | 52.1 | 47.9 |
| 2 | 9.70 | 10.3 | 8.70 | 4.35 | 5.35 | 18.7 | 4.35 | 1.00 | 50.0 | 50.0 |
| 3 | 9.70 | 11.3 | 8.60 | 4.70 | 5.00 | 22.0 | 3.90 | 1.10 | 54.7 | 45.3 |
| 4 | 8.99 | 14.5 | 7.69 | 4.15 | 4.84 | 26.9 | 3.54 | 1.30 | 54.0 | 46.0 |
| 5 | 8.99 | 13.3 | 7.79 | 4.95 | 4.04 | 29.7 | 2.84 | 1.20 | 63.6 | 36.4 |
| 6 | 8.86 | 14.5 | 7.58 | 4.70 | 4.16 | 30.8 | 2.88 | 1.28 | 62.0 | 38.0 |
| 7 | 8.86 | 13.9 | 7.63 | 4.30 | 4.56 | 27.0 | 3.33 | 1.23 | 56.4 | 43.6 |
| 8 | 8.95 | 10.3 | 8.03 | 5.35 | 3.60 | 25.6 | 2.68 | 0.92 | 66.6 | 33.4 |
| 9 | 8.89 | 10.0 | 8.00 | 5.45 | 3.44 | 25.8 | 2.55 | 0.89 | 68.1 | 31.9 |
| 10 | 9.60 | 13.1 | 8.34 | 4.85 | 4.75 | 26.5 | 3.49 | 1.26 | 58.2 | 41.8 |

The results of Table 4 suggest that the unreacted monomers and solvent are effectively removed from the polymer solution obtained after solution polymerization without excessively high shear of an extruder by sequentially using the gas-liquid separator and the stripper in the preparation process of the EPDM elastic copolymer. Accordingly, the method of the present invention greatly improves energy efficiency, compared to the conventional method, and prepares an EPDM product having a high molecular weight.

The invention claimed is:

1. A method of preparing an elastic terpolymer, comprising the steps of:
copolymerizing a monomer composition including 40 to 70% by weight of ethylene, 15 to 55% by weight of alpha olefin having 3 to 20 carbon atoms, and 0.5 to 20% by weight of diene in the presence of a metallocene catalyst and a solvent in a polymerization reactor so as to prepare a polymer solution including an ethylene-alpha olefin-diene-based copolymer; and
separating the solvent and unreacted monomers from the polymer solution by sequentially using an anhydrous gas-liquid separator and a steam stripper so as to recover the ethylene-alpha olefin-diene-based copolymer,
wherein 40 to 70% by weight of the total weight of all materials excluding the total polymer included in the polymer solution are separated and removed in the anhydrous gas-liquid separator, and a residual solvent and unreacted monomers are separated and removed in the steam stripper,
wherein the method comprises a process of removing the solvent and unreacted monomers from the polymer solution under conditions of a temperature of 150 to 160° C. and a pressure of 5 to 10 bar in an upper portion of the anhydrous gas-liquid separator, and
wherein the method comprises a process of removing the residual solvent and unreacted monomers, that are passed through the anhydrous gas-liquid separator, by applying steam as a carrier gas under conditions of a temperature of 140 to 180° C. and a pressure of 4 to 10 bar in the steam stripper.

2. The method of claim 1, comprising the step of recovering the solvent and unreacted monomers included in the copolymer so that they are included in an amount of 10% by weight or less, based on the total weight of the copolymer, in the steam stripper.

3. The method of claim 1, wherein a content of the ethylene-alpha olefin-diene-based copolymer included in the polymer solution before it is passed through the anhydrous gas-liquid separator is 10 to 20% by weight, and a content of the ethylene-alpha olefin-diene-based copolymer included in the polymer solution after it is passed through the anhydrous gas-liquid separator is 20 to 50% by weight.

4. The method of claim 1, wherein the solvent and unreacted monomers separated from the anhydrous gas-liquid separator and the steam stripper are reused in copolymerization for the preparation of the ethylene-alpha olefin-diene-based copolymer.

5. The method of claim 1, further comprising the step of preparing the copolymer in the form of bales or pellets, after the step of recovering the copolymer.

6. The method of claim 1, wherein the metallocene catalyst is a catalytic composition including a first transition metal compound represented by the following Chemical Formula 1 and a second transition metal compound represented by the following Chemical Formula 2:

[Chemical Formula 1]

[Chemical Formula 2]

wherein $R_1$ to $R_{13}$ are the same as or different from each other, and each is independently hydrogen, an alkyl radical having 1 to 20 carbon atoms, an alkenyl radical having 2 to 20 carbon atoms, an aryl radical having 6 to 20 carbon atoms, a silyl radical, an alkylaryl radical having 7 to 20 carbon atoms, an arylalkyl radical having 7 to 20 carbon atoms, or a hydrocarbyl-substituted metalloid radical of a Group IV metal; of $R_1$ to $R_{13}$, two different neighboring groups are connected to each other by an alkylidine radical including an alkyl having 1 to 20 carbon atoms or an aryl radical having 6 to 20 carbon atoms to form an aliphatic or aromatic ring;

M is a Group IV transition metal;

$Q_1$ and $Q_2$ are the same as or different from each other, and each is independently a halogen radical, an alkyl radical having 1 to 20 carbon atoms, an alkenyl radical having 2 to 20 carbon atoms, an aryl radical having 6 to 20 carbon atoms, an alkylaryl radical having 7 to 20 carbon atoms, an arylalkyl radical having 7 to 20 carbon atoms, an alkylamido radical having 1 to 20 carbon atoms, an arylamido radical having 6 to 20 carbon atoms, or an alkylidene radical having 1 to 20 carbon atoms.

7. The method of claim 1, wherein the catalytic composition further includes one or more cocatalytic compounds selected from the group consisting of the following Chemical Formula 3, Chemical Formula 4, and Chemical Formula 5:

$$—[Al(R)—O]_n—$$ [Chemical Formula 3]

wherein Rs are the same as or different from each other, and each is independently a halogen, a hydrocarbon having 1 to 20 carbon atoms, or a halogen-substituted hydrocarbon having 1 to 20 carbon atoms; and n is an integer of 2 or more;

$$D(R)_3$$ [Chemical Formula 4]

wherein R is the same as defined in Chemical Formula 3; and D is aluminum or boron;

$$[L-H]^+[ZA_4]^- \text{ or } [L]^+[ZA_4]^-$$ [Chemical Formula 5]

wherein L is a neutral or cationic Lewis acid; H is a hydrogen atom; Z is an element of Group 13; and As are the same as or different from each other, and each is independently an aryl group having 6 to 20 carbon atoms or an alkyl group having 1 to 20 carbon atoms, at which one or more hydrogen atoms are substituted or unsubstituted with a halogen, a hydrocarbon having 1 to 20 carbon atoms, an alkoxy, or a phenoxy.

8. The method of claim 1, wherein alpha olefin is one or more selected from the group consisting of propylene, 1-butene, 1-hexene, and 1-octene, and the diene is one or more selected from the group consisting of 5-ethylidene-2-norbornene, 5-methylene-2-norbornene, 5-vinyl-2-norbornene, 1,4-hexadiene, and dicyclopentadiene.

* * * * *